(12) United States Patent
Suhre et al.

(10) Patent No.: US 10,908,259 B2
(45) Date of Patent: Feb. 2, 2021

(54) METHOD FOR DETECTING A SCREENING OF A SENSOR DEVICE OF A MOTOR VEHICLE BY AN OBJECT, COMPUTING DEVICE, DRIVER-ASSISTANCE SYSTEM AND MOTOR VEHICLE

(71) Applicant: VALEO Schalter und Sensoren GmbH, Bietigheim-Bissingen (DE)

(72) Inventors: Alexander Suhre, Bietigheim-Bissingen (DE); Youssef-Aziz Ghaly, Bietigheim-Bissingen (DE); Urs Luebbert, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 244 days.

(21) Appl. No.: 15/532,608

(22) PCT Filed: Nov. 30, 2015

(86) PCT No.: PCT/EP2015/077999
§ 371 (c)(1),
(2) Date: Jun. 2, 2017

(87) PCT Pub. No.: WO2016/087339
PCT Pub. Date: Jun. 9, 2016

(65) Prior Publication Data
US 2017/0343649 A1    Nov. 30, 2017

(30) Foreign Application Priority Data

Dec. 5, 2014    (DE) ........................ 10 2014 118 035

(51) Int. Cl.
*G01S 7/40*    (2006.01)
*G01S 15/931*    (2020.01)
(Continued)

(52) U.S. Cl.
CPC ............ *G01S 7/4004* (2013.01); *G01S 7/497* (2013.01); *G01S 7/52004* (2013.01);
(Continued)

(58) Field of Classification Search
None
See application file for complete search history.

(56) References Cited

U.S. PATENT DOCUMENTS

2006/0140449 A1* 6/2006 Otsuka ................. G06K 9/3241
382/104
2006/0284760 A1* 12/2006 Natsume ............. B60R 21/0134
342/70
(Continued)

FOREIGN PATENT DOCUMENTS

DE    197 21 901 A1    11/1997
DE    103 11 958 A1    11/2003
(Continued)

OTHER PUBLICATIONS

Translation of DE102012017668 (Year: 2012).*
(Continued)

*Primary Examiner* — Whitney Moore
(74) *Attorney, Agent, or Firm* — Osha Bergman Watanabe & Burton LLP

(57) ABSTRACT

A method for detecting a screening of a sensor device of a motor vehicle by an object. The method includes receiving at least one echo signal, captured by the sensor device, that characterizes a spacing between the sensor device and the object, determining a capture region for the sensor device based on the at least one received echo signal, checking whether the capture region is being screened by the object at least in some regions, assigning the at least one echo signal to a discrete spacing value from multiple discrete spacing values, determining, for each discrete spacing value a power
(Continued)

Figure 1:
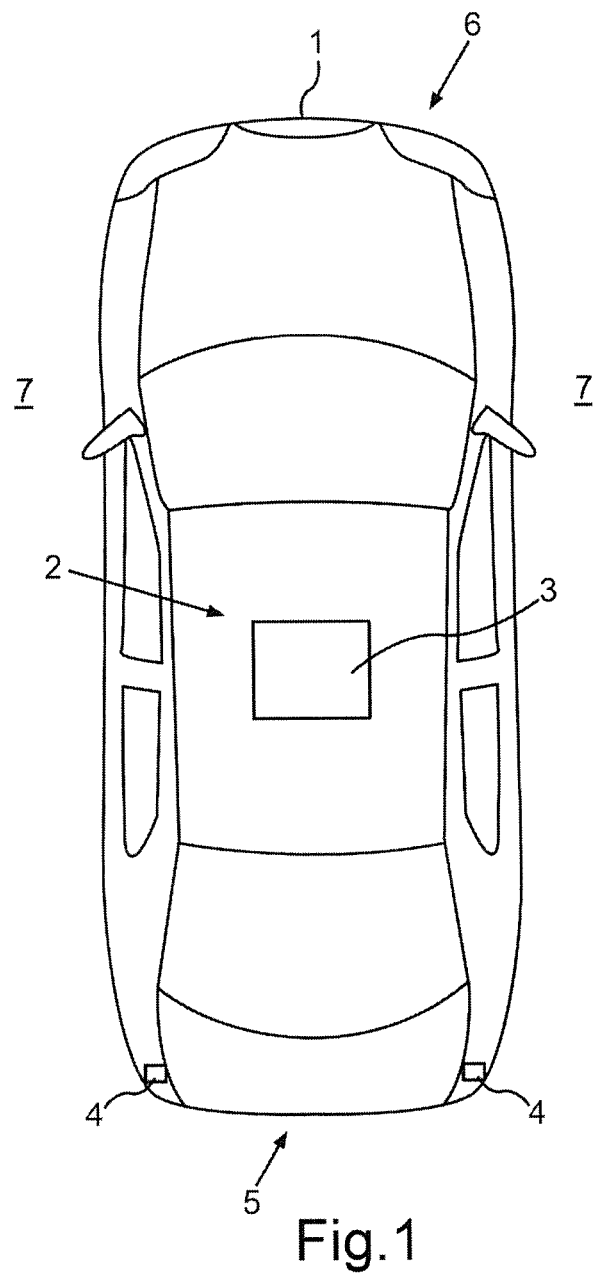

value based on the echo signal, and deciding, by a classifier based on the power values, whether a predetermined proportion of the capture region is being screened by the object.

10 Claims, 4 Drawing Sheets

(51) Int. Cl.
| | | |
|---|---|---|
| *G01S 13/931* | (2020.01) | |
| *G01S 13/72* | (2006.01) | |
| *G01S 15/66* | (2006.01) | |
| *G01S 17/931* | (2020.01) | |
| *G01S 7/497* | (2006.01) | |
| *G01S 7/52* | (2006.01) | |

(52) U.S. Cl.
CPC .......... *G01S 13/726* (2013.01); *G01S 13/931* (2013.01); *G01S 15/66* (2013.01); *G01S 15/931* (2013.01); *G01S 17/931* (2020.01); *G01S 2007/4039* (2013.01); *G01S 2007/4975* (2013.01); *G01S 2007/52009* (2013.01); *G01S 2013/9315* (2020.01); *G01S 2013/9323* (2020.01); *G01S 2013/9324* (2020.01); *G01S 2013/93272* (2020.01)

(56) References Cited

U.S. PATENT DOCUMENTS

2009/0243912 A1* 10/2009 Lohmeier ............ G01S 7/4004
342/70
2017/0067991 A1* 3/2017 Liu ......................... G01S 13/58

FOREIGN PATENT DOCUMENTS

| DE | 10 2006 027678 A1 | 12/2006 |
|---|---|---|
| DE | 10 2012 017668 A1 | 3/2014 |
| EP | 2639781 A1 | 9/2013 |

OTHER PUBLICATIONS

International Search Report issued in PCT/EP2015/077999 dated Feb. 12, 2016 (2 pages).
Written Opinion of the International Searching Authority issued in PCT/EP2015/077999 dated Feb. 12, 2016 (8 pages).
German Search Report issued in Application No. 10 2014 118 035.6 prepared on Jan. 8, 2015 (8 pages).

\* cited by examiner

METHOD FOR DETECTING A SCREENING OF A SENSOR DEVICE OF A MOTOR VEHICLE BY AN OBJECT, COMPUTING DEVICE, DRIVER-ASSISTANCE SYSTEM AND MOTOR VEHICLE

The present invention relates to a method for detecting a screening of a sensor device of a motor vehicle by an object, in which at least one echo signal, captured by the sensor device, that characterizes a spacing between the sensor device and the object is received by means of a computing device, a capture region for the sensor device is determined, and on the basis of the at least one received echo signal it is checked whether the capture region of the sensor device is being screened by the object, at least in some regions. The invention relates, in addition, to a computing device for a driver-assistance system. In addition, the invention relates to a driver-assistance system and also to a motor vehicle.

In the present case, interest is directed in particular towards sensor devices for motor vehicles. These sensor devices may, for example, have been arranged in distributed manner on the motor vehicle and may serve to capture or to detect an object in an ambient region of the motor vehicle. With the sensor devices, in particular a spacing between the motor vehicle and the object can be detected. Sensor devices of such a type conventionally operate in accordance with the echo-sounding principle. This means that the sensor devices emit a transmit signal which is reflected from the object in the ambient region of the motor vehicle. The reflected transmit signal is then received back as an echo signal by the sensor device. On the basis of the time-delay between the emitting of the transmit signal and the receiving of the echo signal, the spacing between the motor vehicle and the object can then be ascertained. These sensor devices may comprise, for example, a radar sensor, an ultrasonic sensor or a laser sensor. The sensor devices are employed, in particular, in connection with driver-assistance systems which assist the driver in the course of driving the motor vehicle. Such a driver-assistance system may be, for example, a parking aid, a blind-spot assistant, an adaptive cruise control or an automatic door-opener.

In order that the driver-assistance systems can reliably assist the driver in the course of driving the motor vehicle, the functionality of the sensor devices has to be guaranteed. The functionality of the sensor device has, for example, been restricted if a capture region of the sensor device has been screened. The capture region of the sensor device describes, in particular, the region in which objects can be detected with the sensor device. The sensor device may, for example, have been screened if a (quasi-)static object is located in the capture region of the sensor device. Consequently, further objects that, for example, proceeding from the sensor device are located behind the screening object can no longer be captured. Particularly if the screening object is located relatively close to the sensor device, this may have the consequence that a large proportion of the capture region is being screened by the object. This is brought about, in particular, by virtue of the fact that the transmit signals that are emitted by the sensor device are scattered on this object, as a result of which the field of view of the sensor device becomes restricted.

In this respect, EP 2 639 781 A1 describes a method for detecting a position of a target object in an ambient region of a motor vehicle. In this case, an item of information concerning a first position of the target object is received by a sensor device, for example by a radar sensor. In addition, an image is received that includes the target object and that was captured by an image sensor, for example by a camera. Furthermore, the first position is projected onto the image, and the first position is refined by a second position which is determined on the basis of a search for symmetry within the image. In this regard, it can in addition be checked whether an object has been screened by other objects.

It is an object of the present invention to present a solution as to how sensor devices, with which objects in an ambient region of a motor vehicle are captured, can be operated more reliably.

In accordance with the invention, this object is achieved by a method, by a computing device, by a driver-assistance system and also by a motor vehicle, having the features according to the respective independent claims. Advantageous configurations of the invention are the subject-matter of the dependent claims, of the description and of the Figures.

A method according to the invention serves for detecting a screening of a sensor device of a motor vehicle by an object. In this regard, at least one echo signal, captured by the sensor device, that characterizes a spacing between the sensor device and the object is received by means of a computing device. In addition, a capture region for the sensor device is determined, and on the basis of the at least one received echo signal it is checked whether the sensor device is being screened by the object, at least in some regions. Furthermore, by means of the computing device at least one echo signal is assigned to a discrete spacing value from a plurality of discrete spacing values. For each of the discrete spacing values, a power value is determined on the basis of the echo signal, and on the basis of the power values a decision is made by means of a classifier as to whether at least a predetermined proportion of the capture region of the sensor device is being screened by the object.

The method relates to the operation of a sensor device of a motor vehicle. With the sensor device, an object in the ambient region of the motor vehicle can be detected. In particular, with the sensor device a spacing between the sensor device and an object can be determined. The sensor device may comprise, for example, a radar sensor, an ultrasonic sensor and/or a laser sensor. The sensor device can be operated in several, in particular temporally consecutive, measuring cycles. In each of the measuring cycles a transmit signal is emitted by means of the sensor device, this transmit signal is reflected on the object, and the reflected sensor signal is received back by the sensor device as an echo signal. On the basis of the time-delay between the emitting of the transmit signal and the receiving of the echo signal, the spacing between the sensor device and the object can be determined.

In the present case, it is now to be detected whether the sensor device has been screened. In particular, it is to be detected whether the sensor device is being screened by the object. The screening of the sensor device may also be designated as 'occlusion'. The sensor device exhibits a predetermined capture region which describes the region in the ambient region of the motor vehicle in which objects can be detected with the sensor device. In other words, it is to be detected whether or not the field of view of the sensor device has been disturbed by the object. It is accordingly to be ascertained whether the object is a screening object in respect of the sensor device. The object may be (quasi-)static and may exhibit a low permittivity in respect of the transmit signal. The object may screen the capture region of the sensor device if a predetermined proportion of the capture region is being screened by the object. The screening of the capture region by the object is dependent on the spacing between the sensor device and the object and/or on the dimensions of the object. In the proportion of the capture region that is being screened by the object, no further objects can be captured by means of the sensor device.

For the purpose of detecting the screening of the capture region of the sensor device, by means of a computing device the at least one echo signal is assigned to a discrete spacing value from a plurality of discrete spacing values. In this case, several echo signals can also be received by means of the computing device and can be assigned to discrete spacing values in each instance. These discrete spacing values may have been predetermined. In addition, for each of the discrete spacing values a power value is determined on the basis of the echo signal. The power value can, for example, be determined on the basis of the signal power of the echo signal. For example, the power value can be determined from the signal amplitude of the echo signal. In addition, a classifier, in particular a linear classifier, is made available, with which the power values for the discrete spacing values are examined. It is also possible to use a non-linear classifier. The classifier can, for example, be made available by an appropriate computing device on which a classification method is implemented. In this case there may also be provision that the classification method is implemented in the computing device itself. In this case the computing device constitutes the classifier. The classifier can now analyse the power values for the respective discrete spacing values and can assign said power values to predetermined classes. For example, the classifier can assign the power values either to a 'screened' class or to a 'not screened' class. In this connection, the 'screened' class signifies that the object that is described by the discrete spacing values and the associated power values is screening the capture region of the sensor device. The 'not screened' class signifies that the object to which the discrete spacing values and the associated power values have been assigned is not screening the sensor device. Consequently, with the aid of the classifier it can be checked in straightforward manner whether or not the object is screening the sensor device. Furthermore, it can be checked whether or not the functionality of the sensor device obtains.

The power values for the plurality of discrete spacing values are preferably assigned to a vector, and the vector is compared with a predetermined decision boundary by means of the classifier. Depending upon the classifier being used, the decision boundary may have been formed variably. The decision boundary may, for example, be constituted by a line, a hyperplane or a probability density function. On the basis of this predetermined decision boundary, the vector that includes the power values for the discrete spacing values can be assigned either to the 'screened' class or to the 'not screened' class. In this way, within a short computing-time it can be decided whether or not the object is screening the sensor device.

In an embodiment, the predetermined decision boundary is predetermined during a training phase of the classifier. During this training phase, a reference object, for example, can be positioned at a predetermined spacing from the sensor device. If the sensor device has been integrated on and/or in the motor vehicle, the reference object can be positioned at a predetermined spacing from the motor vehicle. Subsequently it can be decided whether the reference object is to be assigned to the 'screened' or 'not screened' class. For this spacing of the reference object, a so-called ground-truth label can be defined. Subsequently the vector can be determined that for the plurality of discrete spacing values includes the power value in each instance.

The previously described steps can be implemented for different spacings between the sensor device and the reference object. In addition, the previously described steps can be implemented for differing reference objects or for several reference objects. The vectors ascertained in the course of the respective measurements, with their associated ground-truth label, can then be transferred to the classifier. On the basis of these values, the classifier can then predetermine the decision boundary.

In a further embodiment, the predetermined decision boundary is checked during a test phase of the classifier. In this regard, a reference object, for example, can be placed at a predetermined spacing from the sensor device. Subsequently the vector can be determined that for the plurality of discrete spacing values includes the power value in each instance. This vector can then be compared with the decision boundary, and thereupon it can be decided whether the reference object will be assigned to the 'screened' or 'not screened' class. In the test phase the functionality of the classifier can consequently be checked.

In a further embodiment, by means of the computing device a plurality of echo signals are received, each of the echo signals being received by the sensor device during the measuring cycle. The sensor device can, for example, be operated in temporally consecutive measuring cycles. In this case it is also conceivable that in each of the measuring cycles only a subsection of the capture region is examined by means of the sensor device for the presence of the object. In the consecutive measuring cycles the complete capture region can also be checked in each instance by means of the sensor device. In the course of each of the measuring cycles, with the sensor device an echo signal is generated and communicated to the computing device. The computing device can then assign the echo signal to the respective discrete spacing value and determine the associated power value. Consequently it can be determined, for example, whether the object that is being captured by means of the sensor device is static or whether a relative motion between the sensor device and the object is taking place.

Moreover, it is advantageous if by means of the computing device a relative location between the sensor device and the object is determined on the basis of the respective power values for the discrete spacing values. With the sensor device the spacing between the sensor device and the object can be determined. Moreover, a spatial dimension of at least one side of the object facing towards the sensor device can be determined. In this way, the arrangement of the object in relation to the sensor device can be determined. There may also be provision that the object is determined with several sensor devices. Alternatively or additionally, starting from various positions the object can be captured by means of the sensor device, and in this case the spacing can be determined in each instance. In this way, the relative location between the sensor device and the object can be determined. Consequently the position of the object in the capture region and the spatial extent of the object in the capture region can be determined.

In a further embodiment, by means of the computing device a first part of the capture region, which has been screened by the object, and a second partial region of the capture region, in which further objects can be captured by means of the sensor device, are determined on the basis of the determined relative location between the sensor device and the object. On the basis of the relative location between the sensor device and the object, and/or on the basis of the dimensions of the object and also on the basis of the capture region of the sensor device, the region of the capture region that is being screened by the object can be determined. In addition, the region that is not being screened by the object can be determined, in which further objects can be detected by means of the sensor device. Consequently it can, for example, be determined whether the sensor device can continue to be employed for capturing objects, and in which region objects can be detected.

Moreover, it is advantageous if by means of the computing device it is checked on the basis of the discrete spacing values whether, proceeding from the sensor device, a further object arranged behind the object, at least in some regions, in the capture region can be captured by means of the sensor device. On the basis of the echo signal and the spacing values derived therefrom, as well as the associated power values, on the one hand it can be ascertained whether a screening object is located in the capture region of the sensor device. Moreover, it is now to be checked whether this screening is so strong that no further objects can be captured any longer behind the screening object. For this purpose, the discrete spacing values can be drawn upon. In particular, the discrete spacing values can be drawn upon that have been assigned to objects behind the screening object. If the power value that has been assigned to such a discrete spacing value falls below a predetermined threshold value, it may be assumed that an object that has been assigned to this discrete spacing value cannot be captured. In this case, the field of view of the sensor device would have been too greatly influenced by the screening object. If, however, the power value for this spacing value exceeds the threshold value, it can be assumed, for example, that objects behind the screened object can nonetheless be captured.

In an embodiment, the classifier is a support-vector machine, a Parzen-window classifier and/or a discriminant-analysis classifier. A support-vector machine can, for example, group the vectors into classes in such a way that around the respective class boundaries as large a region as possible remains free from vectors. Moreover, the classifier may have been designed in accordance with the principle of a Parzen-window classification method. Moreover, it is conceivable that the classifier is a discriminant-analysis classifier, for example a Fisher linear discriminant or a perceptron.

A computing device according to the invention for a driver-assistance system of a motor vehicle has been designed to implement a method according to the invention. In the case of the computing device, it may be a question, for example, of a programmable computer such as, for instance, a digital signal processor (DSP), a microcontroller or such like. Accordingly, a computer program may be provided which, for example, has been saved on a storage medium (RAM, ROM, flash memory), said program having been programmed to execute the method described herein when it is executed on the computer. In particular, the program can be executed on the computing device.

A driver-assistance system according to the invention for a motor vehicle includes a computing device according to the invention. The driver-assistance system may be, for example, a parking aid, a blind-spot assistant, an adaptive cruise control or an automatic door-opener. The driver-assistance system may, in addition, exhibit an output device by means of which an output is output to the driver of the motor vehicle in case it is detected by means of the computing device that the object is screening the sensor device. Hence the driver can be informed that the sensor device cannot capture any objects at the moment.

A motor vehicle according to the invention includes a driver-assistance system according to the invention. The motor vehicle takes the form of, in particular, a passenger car.

The preferred embodiments presented with reference to the method according to the invention, and the advantages thereof, apply correspondingly to the computing device according to the invention, to the driver-assistance system according to the invention, and also to the motor vehicle according to the invention.

Further features of the invention result from the claims, the Figures and the description of the Figures. The features and feature combinations stated above in the description, and also the features and feature combinations stated below in the description of the Figures and/or shown in the Figures alone, can be used not only in the combination specified in each instance but also in other combinations or on their own, without departing from the scope of the invention. Consequently, configurations of the invention are also to be regarded as encompassed and disclosed that have not been explicitly shown and elucidated in the Figures but that are evident from the elucidated configurations by virtue of separate feature combinations and that can be produced. Configurations and feature combinations that consequently do not exhibit all the features of an originally formulated independent claim are also to be regarded as disclosed.

The invention will now be elucidated in more detail on the basis of preferred exemplary embodiments and also with reference to the appended drawings.

Figure 2:
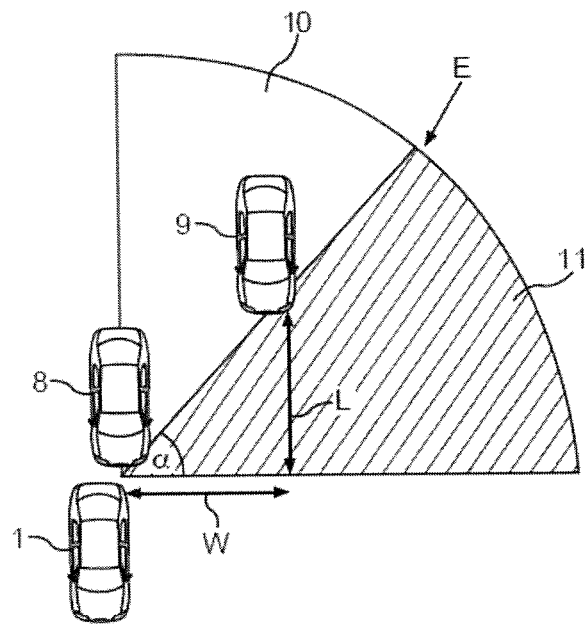
Figure 3:
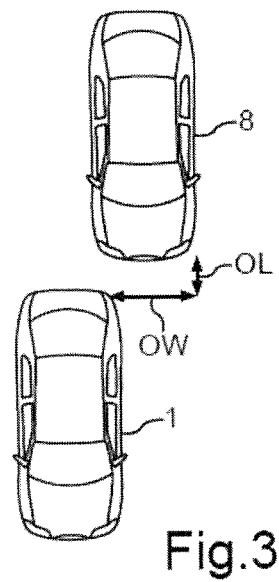
Figure 4:
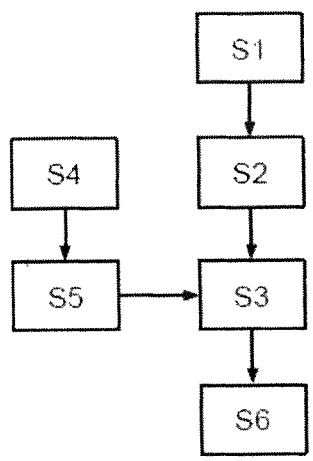
Figure 5:
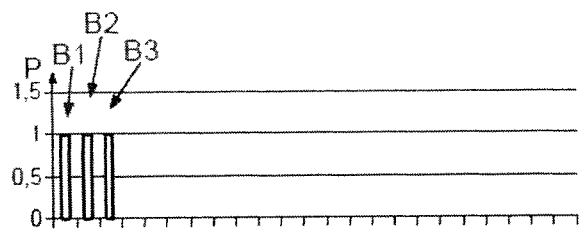
Figure 7:
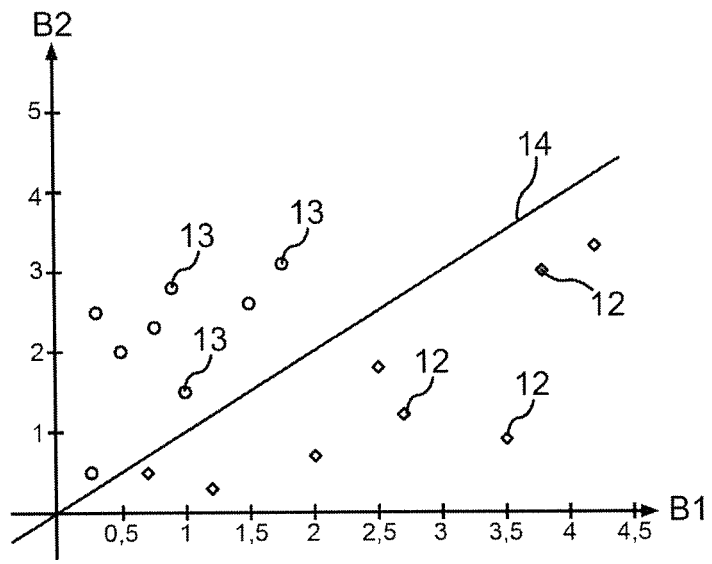

Shown in these drawings are:

FIG. 1 a schematic representation of a motor vehicle according to an embodiment of the present invention;

FIG. 2 the motor vehicle according to FIG. 1, with further objects located in a capture region of a sensor device of the motor vehicle;

FIG. 3 an enlarged representation of a detail of FIG. 2;

FIG. 4 a schematic flow chart of a method according to the invention for detecting a screening of the sensor device of the motor vehicle;

FIG. 5, 6 respective power values for spacing values that were determined on the basis of echo signals of the sensor device; and FIG. 7, 8 groupings of the power values in classes with the aid of classifiers.

FIG. 1 shows a motor vehicle 1 according to an embodiment of the present invention. The motor vehicle 1 in the present exemplary embodiment takes the form of a passenger car. The motor vehicle 1 further includes a driver-assistance system 2 which, for example, may take the form of a parking-aid system, an adaptive cruise control, a blind-spot assistant or such like.

The driver-assistance system 2 includes at least one sensor device 4, by means of which an object 8 in an ambient region 7 of motor vehicle 1 can be captured. The ambient region 7 completely surrounds motor vehicle 1. In the present case, an object 8 which is arranged in the ambient region 7 behind motor vehicle 1 can be captured with the at least one sensor device 4. The sensor device 4 has been designed to emit a transmit signal which is reflected from object 8. The reflected transmit signal arrives back at the sensor device 4 as an echo signal. On the basis of the time-delay, the spacing between the sensor device 4 and object 8 can be determined. The sensor device 4 may in principle take the form of an ultrasonic sensor, a radar sensor or a laser sensor. The sensor device may have been arranged in a front region 6 and/or in a rear region 5 of motor vehicle 1.

In the present exemplary embodiment, motor vehicle 1—or, to be more exact, the driver-assistance system 2—includes two spacing sensors 4 which take the form of radar sensors and which have been arranged in the rear region 5 of the motor vehicle. The spacing sensors may, in particular, take the form of continuous-wave radar sensors. The spacing sensors 4 may, for example, have been arranged in concealed manner behind a bumper of motor vehicle 1. Motor vehicle 1—or, to be more exact, the driver-assistance system 2—exhibits, in addition, a computing device 3. The computing device 3 may, for example, be constituted by a computer, by a digital signal processor or such like. The computing device 3 may also be an electronic control unit (ECU) of motor vehicle 1.

In the present case, it is to be checked whether one of the sensor devices 4 has been masked by an object 8. This is represented in exemplary manner in FIG. 2. Here, object 8, which is likewise a motor vehicle, is located behind motor vehicle 1. In addition, a further object 9, which likewise takes the form of a motor vehicle, is located behind motor vehicle 1. Moreover, in FIG. 2 a capture region E of the rear left sensor device 4 is represented. In the present case, the capture region E has been screened, at least in some regions, by object 8. The screening results by virtue of the relative location of object 8 in relation to the spacing sensor 4. In the present case, the edge of object 8 facing towards the spacing sensor 4 in the capture region E exhibits, for example, the lateral spacing OW and also the longitudinal spacing OL. This can be discerned in FIG. 3, which shows an enlarged representation of FIG. 2.

The capture region E in the present case is assumed to have the shape of a sector of a circle. The capture region E is consequently divided into a first partial region 10, which has been screened by object 8, and into a second partial region 11 in which, where appropriate, further objects 9 can be detected by means of the sensor device 4. The second partial region 11 exhibits the beam angle $\alpha$. In the present case, only a part of the further object 9 can be captured by means of the sensor device 4. Consequently the lateral spacing W and the longitudinal spacing L can, for example, be determined by means of the sensor device. The lateral spacing W may be, for example, a spacing at which a warning signal is output if an object 9 is located there.

FIG. 4 shows a schematic flow chart of a method for detecting a screening of the sensor device 4 by object 8. In a step S1, a plurality of measuring cycles are implemented with the spacing sensor 4. In the course of each measuring cycle a transmit signal is emitted, and the echo signal reflected from object 8 is received. On the basis of the received echo signal, a power can be determined. This power is measured, in particular, as a function of two discrete variables, namely the spacing and the velocity. The spacing between the spacing sensor 4 and object 8 can be determined on the basis of the time-delay. The velocity—or, to be more exact, the relative velocity between motor vehicle 1 and object 8—can, for example, be determined on the basis of a Doppler shift of the echo signal. On the basis of the spacing and the velocity, a two-dimensional function of the power can be defined which comprises the spacing as first variable and the velocity as second variable. In the present case, object 8 represents, in particular, a static object, for example a parked motor vehicle. Consequently the component represented by the velocity cannot be taken into consideration.

In a step S2, the echo signal is processed further by means of the computing device 3. The echo signal, which describes a spacing between the sensor device 4 and object 8, can now be assigned to a discrete spacing value B1, B2, B3. For each of the spacing values B1, B2, B3, a power value P can then be determined by means of the computing device. The power value P can be determined for each of the discrete spacing values B1, B2, B3 on the basis of the signal power of the echo signal. The respective power values P for each of the discrete spacing values B1, B2, B3 are assigned to a vector.

In a step S3, the vector is compared with a predetermined decision boundary by means of a classifier. The classifier can be made available by an appropriate computer on which an appropriate classification method is implemented. The classifier can also be made available by the computing device 3 itself. In the present case it will be assumed that in the case of a screening the screening object 8 is situated at a spacing remote from motor vehicle 1—or, to be more exact, from the spacing sensor 4. In this case, the power value P for the discrete spacing values B1, B2, B3 that is closest to that spacing will be highest. Similarly, the power or the power value P for the other spacing values B1, B2, B3 will be very much smaller. These power values may be at the level of noise, for example. On the basis of the power values P for the discrete spacing values B1, B2, B3, on the one hand it can now be ascertained whether a screening object 8 is arranged in the capture region E of the spacing sensor 4. Furthermore, it can be determined whether the screening is so strong that the power values P for regions behind object 8 are sufficiently small. Consequently it can be inferred that the spacing sensor 4 can 'see' nothing more behind object 8, and the field of view has consequently been impaired.

Figure 6:
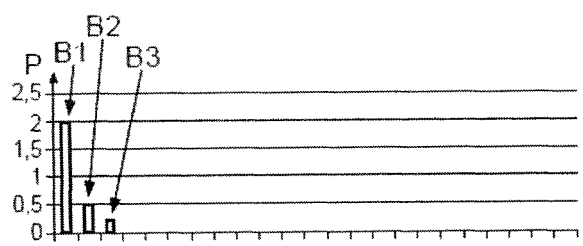

In the unscreened case, the power values P for the respective discrete spacing values B1, B2, B3 should exhibit similar values. This is represented in FIG. 5, for example. In the screened case, the power values P should exhibit a clear maximum with respect to the power value P for one of the discrete spacing values B1, B2, B3, and for the other spacing values B1, B2, B3 the power values P should be distinctly lower. In the present case this is represented in exemplary manner in FIG. 6, the power value P for the discrete spacing value B1 here being distinctly larger than the power values P for spacing values B2 and B3. Patterns of such a kind with respect to the power values can be recognised by the classifier.

For the purpose of determining the decision boundary, the classifier can firstly be operated in a training phase according to step S4. For this purpose, a reference object, for example, can be positioned at a predetermined spacing from the spacing sensor. Subsequently it can be decided to which class—'screened' or 'not screened'—this spacing is to pertain. Consequently a ground-truth label can be defined. Subsequently the vector that comprises the discrete spacing values B1, B2, B3 and the associated power values P can be determined. This can be carried out for different spacings between the spacing sensor 4 and the reference object, and also for different reference objects. On the basis of the measured vectors with their ground-truth label, the classifier can then determine the decision boundary which is, for example, a line, a hyperplane or a probability density function, depending upon the classifier being used.

In the present exemplary embodiment, it is stipulated likewise according to step S5, since the decision boundary is checked in a test phase of the classifier. For this purpose, an object can be positioned at a predetermined spacing from the spacing sensor 4.

Subsequently the vector can be determined. In addition, the vector can be compared with the decision boundary, and it can be decided whether this object will be assigned to the 'screened' or 'not screened' class. This has, for example, been made clear in connection with FIG. 7. Here, appropriate training data, for example, for two classes to be considered have been represented as points 12 and 13. The classifier now tries to find a mathematical rule in order to assign a new point 12, 13 unambiguously to one of the two classes. This can be done in this example by a line 14 (for multi-dimensional points, this would be a hyperplane) being drawn that separates the two classes as well as possible. A test-data point is assigned to the class on whose side of the line it is located.

Figure 8:
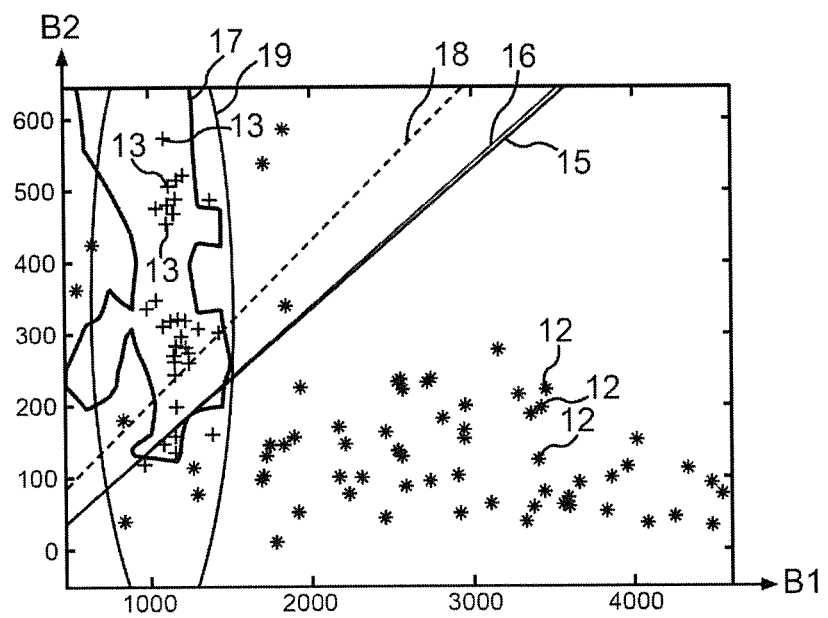

In step S3, the comparison now takes place of the ascertained power values P for the discrete spacing values B1 and B2 as a function of the decision boundary. In the present case, points 12 have been assigned to the 'screened' class, and points 13 have been assigned to the 'not screened' class. It should be noted that only two-dimensional input data were used in FIG. 8. This was chosen for the simple reason of making the concept more readily visible. In like manner, multi-dimensional input data may be used. In the present case, line 15 shows the decision boundary of a first Bayes classifier. Line 16 shows the decision boundary of a discriminant-analysis classifier, for example of Fisher's linear discriminant. Curve 17 describes the decision boundary of a Parzen classifier. Line 18 shows the decision boundary of a classifier that operates on the basis of a synthetic neural network, for example on the basis of a perceptron. Curve 19 describes the decision boundary of a further Bayes classifier.

Consequently, in a step S6 it can be decided by means of the classifier whether the vector that comprises the respective power values P for the discrete spacing values B1, B2, B3 will be assigned to a 'screened' class or to a 'not screened' class. Consequently it can be determined in straightforward manner whether or not object 8 is screening the capture region E of the spacing sensor. In addition, it can be determined to what extent object 8 is screening the capture region E of the spacing sensor 4.

The invention claimed is:

1. A method for detecting a screening of a sensor device of a motor vehicle by an object, the method comprising:
   receiving, by a computing device, at least one echo signal, captured by the sensor device, that characterizes a distance between the sensor device and the object;
   determining a capture region for the sensor device using the at least one echo signal;
   checking whether the capture region of the sensor device is being screened by the object at least in some regions using the at least one echo signal;
   assigning, by the computing device, the at least one echo signal to a discrete distance value from a plurality of discrete distance values;
   determining, for each of the plurality of discrete distance values, a power value using the at least one echo signal;
   assigning the power values for the plurality of discrete distance values to a vector;
   comparing the vector with a predetermined decision boundary by a classifier;
   deciding, by the classifier and using the power values, as to whether at least a predetermined proportion of the capture region of the sensor device is being screened by the object;
   determining, by the computing device, a relative location between the sensor device and the object using the respective power values for the plurality of discrete distance values; and
   determining using the determined relative location between the sensor device and the object, by the computing device, a first partial region of the capture region that has been screened by the object and a second partial region of the capture region in which another object is captured by the sensor device.

2. The method according to claim 1, wherein the predetermined decision boundary is predetermined during a training phase of the classifier.

3. The method according to claim 1, wherein the predetermined decision boundary is checked during a test phase of the classifier.

4. The method according to claim 1, wherein a plurality of echo signals are received by the computing device, each of the echo signals being received by the sensor device during a measuring cycle.

5. The method according to claim 1, wherein on the basis of the discrete spacing values, the computing device checks whether, proceeding from the sensor device, a further object arranged behind the object at least in some regions, is able to be captured in the capture region by the sensor device.

6. The method according to claim 1, wherein the classifier is a support-vector machine, a Parzen-window classifier and/or a discriminant-analysis classifier.

7. A computing device for a driver-assistance system of a motor vehicle, configured to implement a method according to claim 1.

8. A driver-assistance system for a motor vehicle comprising: a computing device according to claim 7; and at least one sensor device.

9. The driver-assistance system according to claim 8, wherein the at least one sensor device exhibits one selected from a group consisting of: a radar sensor, an ultrasonic sensor, a laser sensor and a camera.

10. A motor vehicle with a driver-assistance system according to claim 8.

* * * * *